Patented Nov. 22, 1949

2,488,913

UNITED STATES PATENT OFFICE 2,488,913

PROCESS FOR MAKING 1:4-DICYANOBUTENE

Henry Percy Wynne Huggill and Randal George Arthur New, Blackley, Manchester, England, assignors to Imperial Chemical Industries Limited, a corporation of Great Britain No Drawing. Application December 9, 1947, Serial No. 790,714. In Great Britain December 13, 1946

3 Claims. (Cl. 260—465.8)

This invention relates to a process for making 1:4-dicyanobutene.

According to this invention we make 1:4-dicyanobutene by interaction of hydrogen cyanide and a compound of the formula

wherein R and R' may be OH, Oacyl, CN, halogen or together may be oxygen, and may be the same or different provided that both are not at the same time halogen.

As suitable compounds of the said formula there are for example 1:2-epoxybutene-3, 1:2-dihydroxybutene-3, 1-cyano-2-hydroxybutene-3, 1-hydroxy-2-cyanobutene-3, 1-chloro-2-hydroxybutene-3, 1-hydroxy-2-chlorobutene-3 and 1-bromo-2-hydroxybutene-3.

The reaction may be carried out for example by heating the reagents together in presence of cuprous chloride.

The product, 1:4-dicyanobutene, is a useful intermediate; for example, it may readily be reduced to hexamethylene diamine.

The invention is illustrated but not limited by the following examples in which the parts are by weight.

Example 1

A mixture of 70 parts of 1:2-epoxybutene-3 and 54 parts hydrogen cyanide is added slowly to a reaction vessel containing 14 parts of cuprous chloride, 0.2 part of copper, 0.3 part of 36% hydrochloric acid, 7 parts of ammonium chloride and 12 parts of water. The vessel is fitted with a reflux condenser, and the contents are stirred and heated to 75-80° C. during 2 hours while nitrogen is passed through the mixture. The mixture is then cooled and extracted with toluene, and the toluene extract is distilled. 1:4-dicyanobutene is obtained, B. P. 160-170° C./10 mm.; M. P. 74° C.

Example 2

A mixture of 5 parts of 1:2-dihydroxybutene-3 and 5 parts of hydrogen cyanide is reacted as described in Example 1, the catalyst mixture consisting of 3 parts of cuprous chloride, 0.05 part of copper, 0.06 parts of 36% aqueous hydrochloric acid, 1.4 parts of ammonium chloride and 2.5 parts of water. The 1:4-dicyanobutene is isolated as described in Example 1.

Example 3

5 parts of 1-cyano-2-hydroxybutene-3 and 3 parts of hydrogen cyanide are caused to interact in the manner described in Example 2 and 1:4-dicyanobutene is isolated as described in Example 1.

The 1-cyano-2-hydroxybutene-3 used in this example may be made as follows:

A mixture of 18 parts of 1:2-epoxybutene-3 and 8 parts of hydrogen cyanide is added slowly to a stirred suspension of 1 part of calcium hydroxide in 5 parts of water, the temperature being kept by cooling at 20-25° C. After 2 hours the 1-cyano-2-hydroxybutene-3 is isolated by extraction with ether and distillation of the dried extract. 1-cyano-2-hydroxybutene-3 is obtained, B. P. 112°/10 mm.

Example 4

5 parts of 2-cyano-1-hydroxybutene-3 and 3 parts of hydrogen cyanide are caused to react in the manner described in Example 2 and 1:4-dicyanobutene is isolated as described in Example 1.

The 2-cyano-1-hydroxybutene-3 used in this example may be made as follows:

A solution of 3 parts of sodium cyanide in 6 parts of water is added to a solution of 5 parts of 2-chloro-1-hydroxybutene-3 in 20 parts of alcohol and the reaction then heated at the boil for 2 hours. It is then cooled and 100 parts of water are added and the 2-cyano-1-hydroxybutene-3 is extracted with ether and distilled. 2-cyano-1-hydroxybutene-3 is obtained, B. P. 120° C./10 mm.

Example 5

A mixture of 11 parts of 1-chloro-2-hydroxybutene-3, 13 parts of precipitated chalk, 0.1 part of copper powder, 3 parts of cuprous bromide and 12 parts of hydrogen cyanide is heated at 140° C. in a stirred closed vessel for 2 hours. The 1:4-dicyanobutene is isolated as described in Example 1.

In place of 1-chloro-2-hydroxybutene-3 in the above example there may be used 1-hydroxy-2-chlorobutene-3.

We claim:

1. A process for the manufacture of 1:4-dicyanobutene which comprises reacting hydrogen cyanide with a 1:2 substituted butene-3 compound chosen from the group consisting of 1:2-dihydroxy butene-3, 1:2-epoxybutene-3, 1-chloro-2-hydroxy butene-3, 1-hydroxy-2-chloro butene-3, 1-bromo-2-hydroxy butene-3, 1 cyano-2 hydroxy butene-3, and 1 hydroxy-2 cyano butene-3, the reaction being carried out by heating the reactants to a temperature of between about 75° C. and 140° C. in the presence of a catalyst comprising a copper salt.

2. The process claimed in claim 1, wherein said copper salt is a cuprous halide.

3. The process claimed in claim 2, wherein said cuprous halide is cuprous chloride.

HENRY PERCY WYNNE HUGGILL.
RANDAL GEORGE ARTHUR NEW.

REFERENCES CITED

The following references are of record in the file of this patent:

UNITED STATES PATENTS

| Number | Name | Date |
| --- | --- | --- |
| 2,342,101 | Cass et al. | Feb. 22, 1944 |
| 2,422,859 | Schulze et al. | June 24, 1947 |

OTHER REFERENCES

Claus, Ber. Deut. Chem., vol. 5, page 360 (1872).

Claus, Liebigs. Ann., vol. 170, page 127 (1873).

Claus, Liebigs Ann., vol. 191, page 92 (1878).

Breckpot, Bull. Soc. Chim. Belg., vol. 39, pages 462–469 (1930).

Coffman, J. Am. Chem. Soc., vol. 51, page 1981 (1935).

Lane et al., J. Am. Chem. Soc., vol. 66, pages 545–548 (1944).